US010691314B1

(12) United States Patent
Freeman et al.

(10) Patent No.: US 10,691,314 B1
(45) Date of Patent: Jun. 23, 2020

(54) CONNECTING USERS TO ENTITIES BASED ON RECOGNIZED OBJECTS

(71) Applicant: STATE FARM MUTUAL AUTOMOBILE INSURANCE COMPANY, Bloomington, IL (US)

(72) Inventors: James M. Freeman, Normal, IL (US); Vaidya Balasubramanian Pillai, Springfield, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 14/703,982

(22) Filed: May 5, 2015

(51) Int. Cl.
| *G06F 3/0484* | (2013.01) |
| *G06K 9/46* | (2006.01) |
| *G06K 9/62* | (2006.01) |
| *G06F 3/0488* | (2013.01) |

(52) U.S. Cl.
CPC ........ *G06F 3/04842* (2013.01); *G06F 3/0488* (2013.01); *G06K 9/4604* (2013.01); *G06K 9/6202* (2013.01)

(58) Field of Classification Search
CPC ............ G06Q 50/265; H04M 1/72536; H04M 2201/50; H04M 2203/306; H04M 2242/30; H04W 4/021; H04W 4/22; G06F 3/04842; G06F 3/0488
USPC .......................................................... 715/835
See application file for complete search history.

(56) References Cited

U.S. PATENT DOCUMENTS

| 7,916,976 | B1* | 3/2011 | Kedikian ................ G06F 16/50 382/305 |
| 8,665,216 | B2* | 3/2014 | Karasin ................... G06F 3/016 345/156 |
| 8,810,684 | B2* | 8/2014 | Chang ............... G06F 17/30259 348/231.1 |
| 9,098,584 | B1* | 8/2015 | Fredinburg ....... G06F 17/30864 |
| 2002/0087704 | A1* | 7/2002 | Chesnais ................. H04L 29/06 709/228 |
| 2004/0203563 | A1* | 10/2004 | Menard .................. H04W 88/04 455/404.1 |
| 2006/0256959 | A1* | 11/2006 | Hymes .................... H04M 1/26 379/433.04 |
| 2006/0280353 | A1* | 12/2006 | Yi ........................ G06K 9/4652 382/135 |
| 2007/0174272 | A1* | 7/2007 | Carter ...................... G06K 9/72 |

(Continued)

OTHER PUBLICATIONS

Nonfinal Office Action, U.S. Appl. No. 14/703,985, dated Nov. 4, 2015.

*Primary Examiner* — Tadesse Hailu
(74) *Attorney, Agent, or Firm* — Marshall, Gerstein & Borun LLP; Randall G. Rueth

(57) ABSTRACT

A computer-implemented method includes detecting a distinct area within an image, comparing detected features of the distinct area within the image to reference features corresponding to a reference image, and determining that the detected distinct area matches the reference image based on the comparison between the detected features and the reference features. The method further includes receiving an indication that the user selects the detected distinct area within the image, retrieving contact information corresponding to the reference image, and causing the client device to display an interface allowing the user to contact the entity.

18 Claims, 12 Drawing Sheets

(56) References Cited

U.S. PATENT DOCUMENTS

| | | | |
|---|---|---|---|
| 2008/0088698 A1* | 4/2008 | Patel | H04N 7/15 348/14.09 |
| 2008/0130960 A1* | 6/2008 | Yagnik | G06K 9/00288 382/118 |
| 2008/0146274 A1* | 6/2008 | Cho | G06F 17/30265 455/556.1 |
| 2008/0176545 A1* | 7/2008 | Dicke | G01C 21/362 455/418 |
| 2008/0220750 A1* | 9/2008 | Steinberg | G06K 9/00221 455/414.1 |
| 2008/0240702 A1* | 10/2008 | Wassingbo | G11B 27/105 396/310 |
| 2008/0309617 A1 | 12/2008 | Kong et al. | |
| 2009/0006484 A1* | 1/2009 | Wang | G06F 17/30247 |
| 2009/0023472 A1* | 1/2009 | Yoo | H04M 1/27455 455/556.1 |
| 2009/0037477 A1* | 2/2009 | Choi | G06F 17/30259 |
| 2009/0055205 A1* | 2/2009 | Nguyen | G06K 9/00771 463/29 |
| 2009/0100047 A1* | 4/2009 | Jones | G06Q 30/0224 |
| 2009/0268888 A1* | 10/2009 | Hsu | H04M 1/27455 379/93.23 |
| 2009/0278766 A1* | 11/2009 | Sako | G02B 27/017 345/8 |
| 2009/0315848 A1 | 12/2009 | Ku et al. | |
| 2009/0316961 A1* | 12/2009 | Gomez Suarez | G06K 9/00228 382/118 |
| 2010/0216441 A1* | 8/2010 | Larsson | G06F 17/3028 455/415 |
| 2010/0228617 A1* | 9/2010 | Ransom | G06Q 30/02 705/14.25 |
| 2010/0253787 A1* | 10/2010 | Grant | G06Q 30/0603 348/207.1 |
| 2011/0022661 A1* | 1/2011 | Alsina | G06Q 10/109 709/205 |
| 2011/0026778 A1* | 2/2011 | Ye | G06K 9/00221 382/118 |
| 2011/0038512 A1* | 2/2011 | Petrou | G06K 9/00288 382/118 |
| 2011/0069823 A1* | 3/2011 | Chen | H04M 1/27455 379/88.19 |
| 2011/0177829 A1* | 7/2011 | Platt | G06Q 10/107 455/456.2 |
| 2012/0045093 A1 | 2/2012 | Salminen et al. | |
| 2012/0047469 A1 | 2/2012 | Chelaru et al. | |
| 2012/0163677 A1* | 6/2012 | Thorn | G06K 9/00221 382/115 |
| 2012/0182316 A1* | 7/2012 | Moha | G06F 17/30274 345/636 |
| 2012/0230539 A1* | 9/2012 | Calman | G06Q 10/06 382/103 |
| 2012/0294495 A1* | 11/2012 | Wren | G06F 21/6263 382/118 |
| 2012/0327006 A1* | 12/2012 | Israr | G06F 3/044 345/173 |
| 2013/0148003 A1* | 6/2013 | Penev | H04N 5/23293 348/333.11 |
| 2013/0156275 A1* | 6/2013 | Amacker | G06K 9/00677 382/118 |
| 2013/0174095 A1* | 7/2013 | Dayan | G06F 3/04817 715/835 |
| 2013/0218858 A1* | 8/2013 | Perelman | G06F 16/9535 707/706 |
| 2013/0262588 A1* | 10/2013 | Barak | H04L 67/22 709/204 |
| 2013/0297604 A1* | 11/2013 | Sutedja | G06Q 10/107 707/737 |
| 2014/0005553 A1* | 1/2014 | Ryan | A61B 5/0062 600/473 |
| 2014/0079298 A1* | 3/2014 | Shah | G06K 9/00221 382/118 |
| 2014/0155022 A1* | 6/2014 | Kandregula | G06Q 50/01 455/405 |
| 2014/0201844 A1* | 7/2014 | Buck | G06F 21/50 726/26 |
| 2014/0214863 A1* | 7/2014 | Rottler | G06Q 10/107 707/754 |
| 2014/0254434 A1* | 9/2014 | Jain | H04L 67/306 370/259 |
| 2014/0358679 A1* | 12/2014 | Levinson | G06Q 30/0251 705/14.49 |
| 2014/0368601 A1* | 12/2014 | deCharms | H04W 4/021 348/14.02 |
| 2015/0085146 A1* | 3/2015 | Khemkar | H04N 7/147 348/207.1 |
| 2015/0092061 A1* | 4/2015 | Chao | G06Q 30/00 348/158 |
| 2015/0134603 A1* | 5/2015 | Melamed | G06F 11/1453 707/609 |
| 2015/0294139 A1* | 10/2015 | Thompson | G06F 17/15 382/112 |
| 2016/0044228 A1* | 2/2016 | Kim | H04N 5/2258 348/345 |
| 2017/0105668 A1* | 4/2017 | el Kaliouby | A61B 5/165 |

* cited by examiner

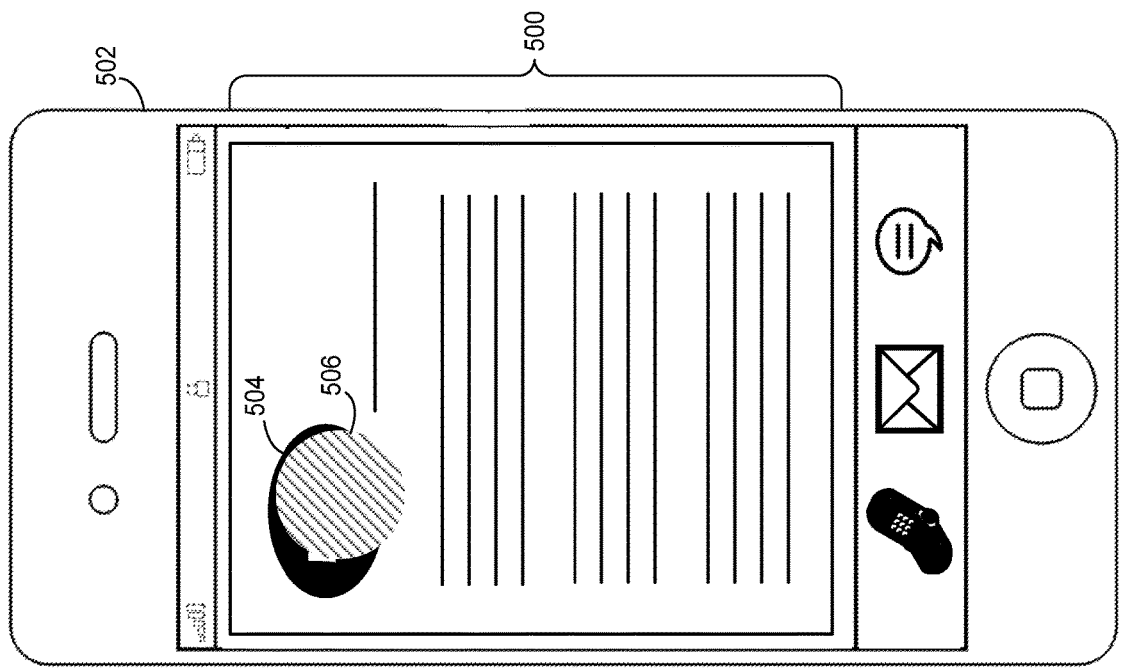
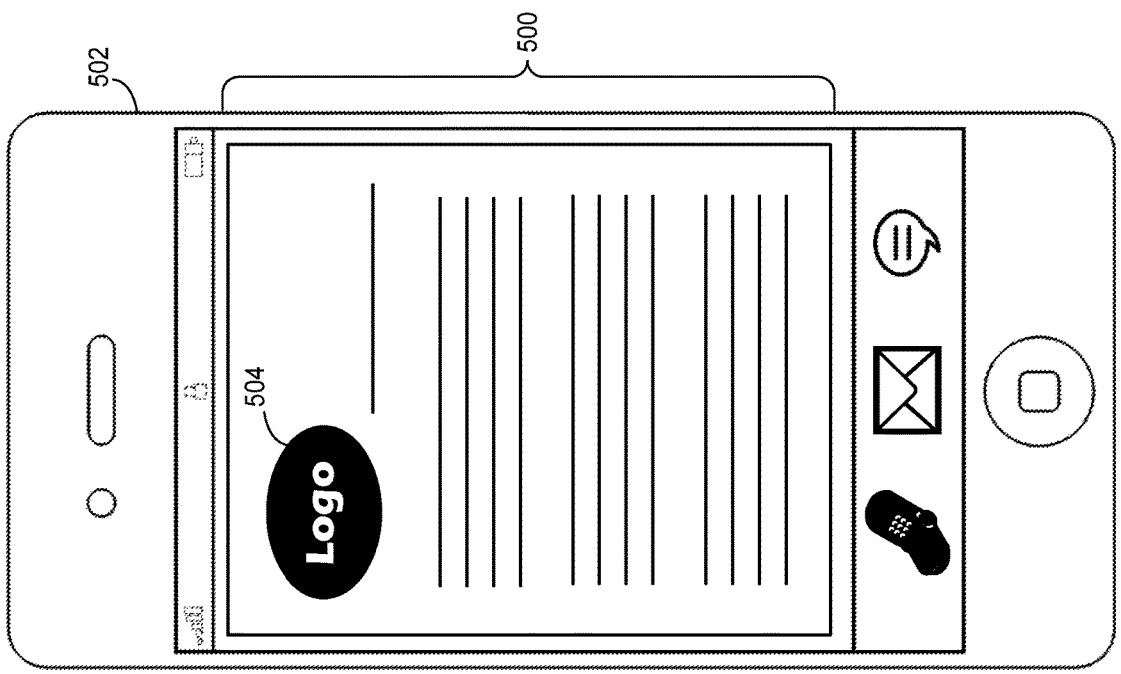
FIG. 5B
FIG. 5A

CONNECTING USERS TO ENTITIES BASED ON RECOGNIZED OBJECTS

CROSS REFERENCES TO RELATED APPLICATIONS

This application is related to U.S. patent application Ser. No. 14/703,985, entitled "INITIATING COMMUNICATIONS BASED ON INTERACTIONS WITH IMAGES" and filed concurrently herewith, the entire disclosure of which is hereby incorporated by reference herein.

TECHNICAL FIELD

The present disclosure generally relates to initiating various types of communications with individuals or entities, and, more particularly, to initiating communications with individuals or entities based on interactions with images corresponding to those individuals or entities.

BACKGROUND

Typical contact lists displayed on mobile devices, such as smart phones, are difficult to navigate for many elderly or handicapped individuals These contact lists can be very lengthy and include an overwhelming amount of information (names, numbers, email addresses, etc.) and navigation functionalities. For this and other reasons related to non-intuitive interfaces, technology companies struggle to market the latest mobile technology to the aging population.

Even for younger users and technologically savvy individuals, lengthy contact lists and typical communication interfaces can be a source of frustration. For example, when scrolling through a gallery of photos, a certain photo may prompt the user to communicate with an individual pictured in the certain photo. However, instead of immediately being able to call, text, or otherwise communicate with the individual, the user is inconvenienced by having to exit the gallery of photos, scroll through a lengthy contact list, locate the contact information of the individual, and initiate the communication.

SUMMARY

In one embodiment, a computer-implemented method comprises detecting, by one or more processors, a distinct area within an image, comparing, by the one or more processors, detected features of the distinct area within the image to reference features corresponding to a reference image, and determining, by the one or more processors, that the detected distinct area matches the reference image based on the comparison between the detected features and the reference features. The method further includes receiving, from a user of a client device, an indication that the user selects the detected distinct area within the image, retrieving, by the one or more processors, contact information corresponding to the reference image, the contact information indicating a method of contacting an entity represented by the reference image, and causing, by the one or more processors, the client device to display an interface allowing the user to contact the entity according to the method of contacting the entity.

In another embodiment, a system for facilitating communications comprises one or more processors and one or more non-transitory memories coupled to the one or more processors. The one or more non-transitory memories include computer executable instructions specially configuring the computer device such that, when executed by the one or more processors, the computer executable instructions cause the one or more processors to: detect a distinct area within an image, compare features of the distinct area within the image to reference features corresponding to a reference image, and determine that the detected distinct area matches the reference image based on the comparison between the detected features and the reference features. The computer executable instructions further cause the one or more processors to receive an indication that the user selects the detected distinct area within the image, retrieve contact information corresponding to the reference image, the contact information indicating a method of contacting an entity represented by the reference image, and cause the client device to display an interface allowing the user to contact the entity according to the method of contacting the entity.

BRIEF DESCRIPTION OF THE DRAWINGS

FIGS. 5A, 5B, and 5C illustrate other example interfaces which can be displayed on a client device, such as the client device illustrated in FIG. 1, and from which a user can initiate communications;

DETAILED DESCRIPTION

Figure 1:
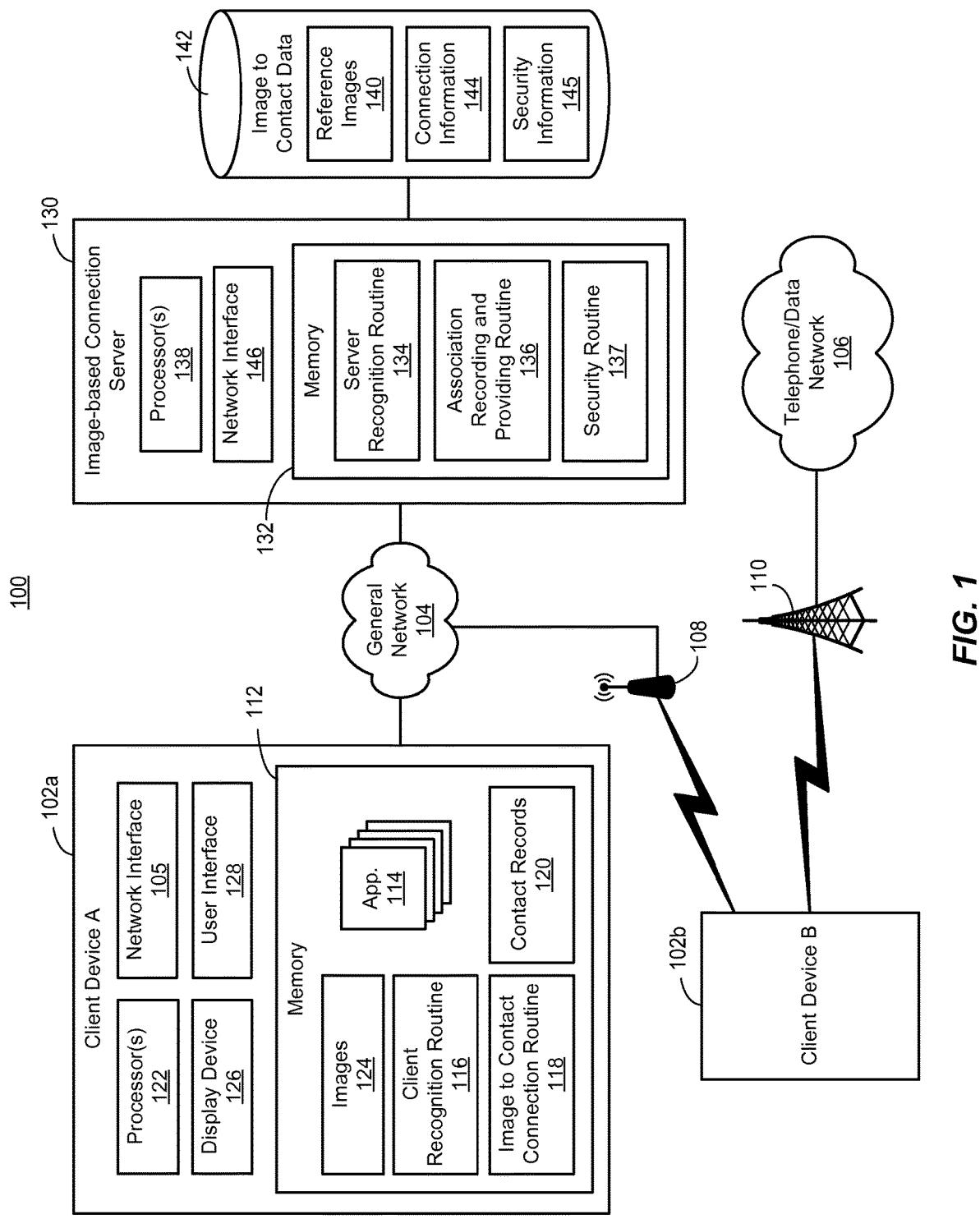
FIG. 1 illustrates an example computing environment for initiating communications based on interactions with images.

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term ' ' is hereby defined to mean . . . " or a similar sentence, there is no intent to limit the meaning of that term, either expressly or by implication, beyond its plain or ordinary meaning, and such terms should not be interpreted to be limited in scope based on any statement made in any section of this patent (other than the language of the claims). To the extent that any term recited in the claims at the end of this patent is referred to in this patent in a manner consistent with a single meaning, that is done for the sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

System Overview

The techniques of the present disclosure may allow users of one or more devices, such as smartphones or tablet computers, to initiate communications (e.g., phone calls) or other interactions (e.g., visits to a website) by selecting a distinct area within a displayed image, document, website, etc. (e.g., displayed on a user interface of the one or more devices). In particular, a computing device may register or associate certain distinct areas within images, documents, websites, etc. with certain contacts, which contacts may be people or other entities, such as businesses. When a user selects (e.g., via a click or tap) a registered distinct area displayed on a certain device, the certain device may present the user with options for initiating communications or other interactions with an entity (e.g., a business or person), or the certain device may automatically initiate communications or other interactions.

In a first type of scenario (referred to herein as "the first scenario"), the techniques of the present disclosure may allow a user to communicate with people, such as friends, acquaintances, family members, etc., by selecting recognized faces of those people in displayed images. A specialized routine (e.g., a facial recognition routine) may recognize facial areas of the people within the displayed images, and stored connection information may associate one or more of the recognized facial areas with contact information (phone numbers, email addresses, social media accounts, etc.) for one or more of the people displayed in the images. For example, a user may view a "gallery" of images on a mobile device, and, while viewing the "gallery" of images, select (e.g., by tapping) a face of a person depicted in one of the images. If the face has been associated with certain contact information for the person depicted in the image, the mobile device may display options (such as call, email, share with, etc.) to the user to allow the user to communicate with the depicted person.

In a second type of scenario (referred to herein as "the second scenario"), the techniques of the present disclosure may allow a user to communicate with or otherwise interact with any suitable entity by clicking a distinct area within an image, which distinct area is determined to have similarities to one or more reference images. For example, a user may select a logo of a business within an image, scanned document, website, etc. Based on one or more stored reference images having similarities to the selected logo, a computing device may determine relevant communication or interaction information, such as phone numbers, webpages, email addresses, etc., corresponding to the business. The computing device may present this relevant communication or interaction information to the user to allow the user to initiate communications or other interactions, or the computing device may automatically initiate communications or other interactions based on the communication or interaction information corresponding to the business. Generally, in the second scenario, reference images and contact information may correspond to people or any other entities with which contact information may be associated, such as businesses, organizations, clubs, websites (e.g., social media networks, blogs, or forums), etc.

FIG. 1 illustrates an example computing environment 100 allowing users of one or more client devices 102*a* and 102*b* to communicate with entities (e.g., people or businesses) based on various interactions with images corresponding to the entities. In particular, the client devices 102*a* and 102*b* may display images to users of the client devices 102*a* and 102*b*, where at least some of the displayed images include distinct selectable areas. When one of the distinct areas is selected by a user (e.g., with a click, tap, or gesture), components of the computing environment 100 may cause an interface to be presented the user, which interface allows the user to connect with (via a call, text, social media post, etc.) a contact associated with the selected one of the distinct areas. In the first scenario, a user may select a face of an individual pictured in an image to initiate a phone call with that individual, or, in the second scenario, a user may select a distinct area having similarities to one or more reference images, which reference images are associated with contact information for an entity (e.g., a business). Generally, upon selection of a distinct area within an image, components of the computing environment 100 may present the user with a various options (phone call, text message, email, etc.) for communicating with an individual pictured in the image or an entity corresponding to the image.

In some implementations related to the second scenario, the components of the computing environment 100 may also allow users to select distinct areas of webpages or other documents displayed by the client devices 102*a* and 102*b*, which distinct areas are recognized as being associated with a certain contact. For example, components of the computing environment 100 may detect certain business logos, persons, products, etc. pictured in webpages, documents, etc. displayed on the client devices 102*a* and 102*b*. By selecting the recognized distinct areas within the webpages or other documents, a user may seamlessly initiate communications with the corresponding entity without having to navigate to another interface or otherwise interrupt a workflow.

The high-level architecture of the computing environment 100 may include both hardware and software applications, as well as various data communications channels for communicating data between the various hardware and software components. The exemplary computing environment 100 shown in FIG. 1 may include additional, fewer, or alternate components, including those discussed elsewhere herein.

The client device 102*a* may be, by way of example, a desktop computer, gaming system, or other personal computing device that is in communicative connection with a general network 104 via one or more wired connections and a network interface 105. The client device 102*b* may be, by way of example, a smartphone, a tablet computing, a gaming device, a laptop computer, or other personal computing device that is in communicative connection with a general network 104 and/or a telephone/data network 106 via one or more wireless connections (e.g., wireless connections to a wireless access point 108 and/or to a cellular base station 110). Although, one client device 102a having wired connections (e.g., a "wired device") and one client device 102b having wireless connections (e.g., a "wireless device") is depicted in FIG. 1, each of the client devices 102a and 102b may have any suitable number of wired and/or wireless connections to the general network 104 and the telephone/data network 106. Moreover, computing environments allowing users to communicate with entities, based on various interactions with images, may include any number (one, two, three, four, etc.) of client devices each having any suitable number of wired and/or wireless connections to a variety of networks. Although not shown FIG. 1, the client device 102b may include all or many of the components depicted in client device 102a.

The general network 104 may include a local area network, the Internet, a metropolitan area network (MAN), a wide area network (WAN), or any other suitable network allowing the client devices 102a and 102b to access webpages, send emails, download content, communicate with contacts (via Internet or Voice Over IP calls, instant messages, social media posts, etc.), receive software updates, etc. The telephone/data network 106 may also allow the client devices 102a and 102b to access webpages, send emails, download content, communicate with contacts, etc. However, the telephone/data network 106 may also include a Public Switched Telephone Network (PSTN) (e.g., including a cellular network of a cellular phone service provider) allowing the client devices 102a and 102b to call a variety of customer premise equipment (CPE), such as cellular phones, landline phones, etc. The telephone/data network 106 may also facilitate the sending and receiving of text messages (e.g., Short Message Service (SMS) messages) to and from the client device 102b.

The client device 102a may include one or more non-transitory memories 112 adapted to store a plurality of applications 114 and a plurality of routines 116, 118, and 120. The applications 114 and routines 116 and 118 may implement at least some of the methods described herein when executed by one or more processors 122. Further, the memories 112 may store a plurality of images 124 captured by an image capture device of the client device 102a (not shown), downloaded to the client device 102a, etc. and a plurality of contact records 120. The one or more memories 112 may include one or more forms of non-transitory, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The plurality of applications 114 may include any suitable applications "installed" on the client device 102a or part of an operating system of the client device 102a. By way of example, the plurality of applications 114 may include a web browser application, an email application, one or more social media applications, a Voice Over IP (VOIP) application, an image and/or video capture application, a news application, a weather application, etc.

The contact records 120 may indicate manners in which a user of the client device 102a may initiate communications with each of a plurality of contacts (e.g., individuals, businesses, or other entities). For example, the contact records 120 may include telephone numbers, email addresses, social media usernames, etc. of a user's friends, family members, coworkers, etc. The contact records 120 may also include contact information (e.g., telephone number or email addresses) for individuals or other entities, which contact information was received via the general network 104 along with webpages, documents, or other content.

The client recognition routine 116 may, when executed by the one or more processors 122, detect certain distinct areas within images, such as the images 124. The client recognition routine 116 may also recognize certain distinct areas within images having similarities to one or more reference images. In the first scenario, the client recognition routine 116 may include specialized algorithms configured to detect faces of people within images. Such specialized algorithms may include, by way of example, principle component analysis, linear discriminant analysis, Bayesian classification, and/or elastic bunch graph matching algorithms. In some cases, one or more of the specialized algorithms utilized by the client recognition routine 116 may be supervised or unsupervised learning algorithms that are specifically trained (e.g., based on one or more sets of training data) to detect or recognize faces within images.

In the second scenario, the client recognition routine 116 may include specialized algorithms configured to identify and/or compare distinct areas within images to one or more reference images. In particular the client recognition routine 116 may compare features, such as color, shape, edges, entropy, texture, etc., of selected or detected areas within image to those features of one or more references images. If the features are similar (e.g., having values within a predetermined threshold), the client recognition routine 116 may determine that the identified distinct areas are similar to the one or more reference images. To identify and compare distinct areas within images the client recognition routine 116 may utilize any number and combination of transforms (blurring, converting a color image to a black and white image, etc.) to the data representing the images.

The image to contact connection routine 118 may, when executed by the one or more processors 122: (i) cause detected areas within images (e.g., detected by the client recognition routine 116) to be associated with certain entities (e.g., individuals, businesses, or other entities indicated in the contact records 120); and/or (ii) identify entities (and corresponding contact information) associated with selected distinct areas within one or more images or within webpages or other documents. In some implementations, the image to contact connection routine 118 may communicate with remote computing devices (e.g., servers) via the general network 104 to determine if detected areas within images are to be associated with a certain contact, to cause detected areas within images to be associated with certain contacts, to retrieve information about a contact (phone numbers, email addresses, etc.), or to perform any other functions related to associating a portion of an image with a contact or utilizing an association of a portion of an image with a contact.

In some implementations, users of the client device 102a may view images, select distinct areas within images, and initiate communications or other interactions with contacts via interactions with a display device 126 and a user interface 128. The display device 126 may include any suitable display utilized with or in mobile or stationary computing devices, such as Light Emitting Diode (LED) displays, organic light emitting diode (OLED) displays, Liquid-crystal displays (LCDs), etc. The user interface 128 may include any suitable combination of touchscreens, buttons, keyboards, etc.

In some implementations, the client devices 102a and 102b may be communicatively connected to an image-based connection server 130 via the general network 104 (and/or the telephone/data network 106). The image-based connection server 130 may include one or more non-transitory server memories 132 storing one or more routines 134, 136, and 137 that, when executed by one or more processors 138, may at least partially implement some the methods discussed herein. In particular, the server recognition routine 134 may detect certain distinct areas within images and/or recognize certain distinct areas within images having similarities to one or more reference images, such as one or more reference images 140 stored on a data storage device 142. The server recognition routine 134 may include specialized algorithms similar to those implemented by the client recognition routine 116 and/or other specialized algorithms to detect and/or recognize distinct areas within images. Generally, distinct areas (e.g., faces or logos) within images may be detected and/or recognized, as discussed further below, by the image-based connection server 130 (e.g., with the server recognition routine 134) alone, by the client devices 102a and 102b alone (e.g., with the client recognition routine 116), or by any suitable combination of the image-based connection server 130 and the client devices 102a and 102b. That is, the functionality of detecting or recognizing distinct areas within images may be split in any suitable manner between the image-based connection server 130 and the client devices 102a and 102b.

The association recording and providing routine 136 may, when executed by the processors 138: (i) record (e.g., as connection information 144) associations between distinct areas within images and contacts, which associations are determined by the image-based connection server 130 and/or the client devices 102a and 102b; and/or (ii) provide indications of associations between distinct areas within images and contacts to the client devices 102a and 102b (e.g., via the networks 104 and 106 and a network interface 146). As with the detecting or recognizing functionality discussed above, functionalities of associating detected distinct areas with contacts, retrieving data indicative of such associations, and/or utilizing such associations may be split in any suitable manner between the image-based connection server 130 and the client devices 102a and 102b.

The security routine 137 may, when executed by the processors 138, regulate which devices (e.g., the client device 102a and 102b) and/or which users of devices may have access to, add to, delete, or otherwise modify certain data stored in the image to contact database 142 or stored in the memory 112. For example, the security routine 137 may authorize certain users to share certain portions of the connection information 144, the contact records 120, and/or the images 124 with other users, or the security routine 137 may authorize certain users to access certain portions of the connection information 144, the contact records 120, and/or the images 124. For example, a user of the client device 102a may associate portions of the contact records 120 with certain distinct areas within the images 124. These example associations may be indicated in the connection information 144. In this example, the security routine 137 may allow or deny a user of the client device 102b access the associations stored in the connection information (e.g., upon a request sent from the client device 102b to the image-based connection server 130). The security routine 137 may regulate which devices and/or which users of devices may have access to, add to, delete, or otherwise modify certain data stored in the image to contact database 142 or stored in the memory 112 based on any suitable types and combinations of criteria indicated in the security information 145. By way of example, the security information 145 may store data indicative of usernames, passwords, identifications of devices (e.g., an International Mobile Station Equipment, or IMEI, number), preferences of one or more users, user names, user locations, etc.

Image-Based Initiation of Communications

FIGS. 2A, 2B, 2C, and 2D illustrate example interfaces in which users of a client device 200 may communicate with contacts based on various interactions with displayed images (e.g., in the first scenario). One of the client devices 102a or 102b may display interfaces such as those illustrated in FIGS. 2A, 2B, 2C, and 2D. Further, the image-based connection server 130 and/or the one of the client devices 102a or 102b may generate at least some of the content displayed in interfaces such as those illustrated in FIGS. 2A, 2B, 2C, and 2D, for example.

Figure 2B:
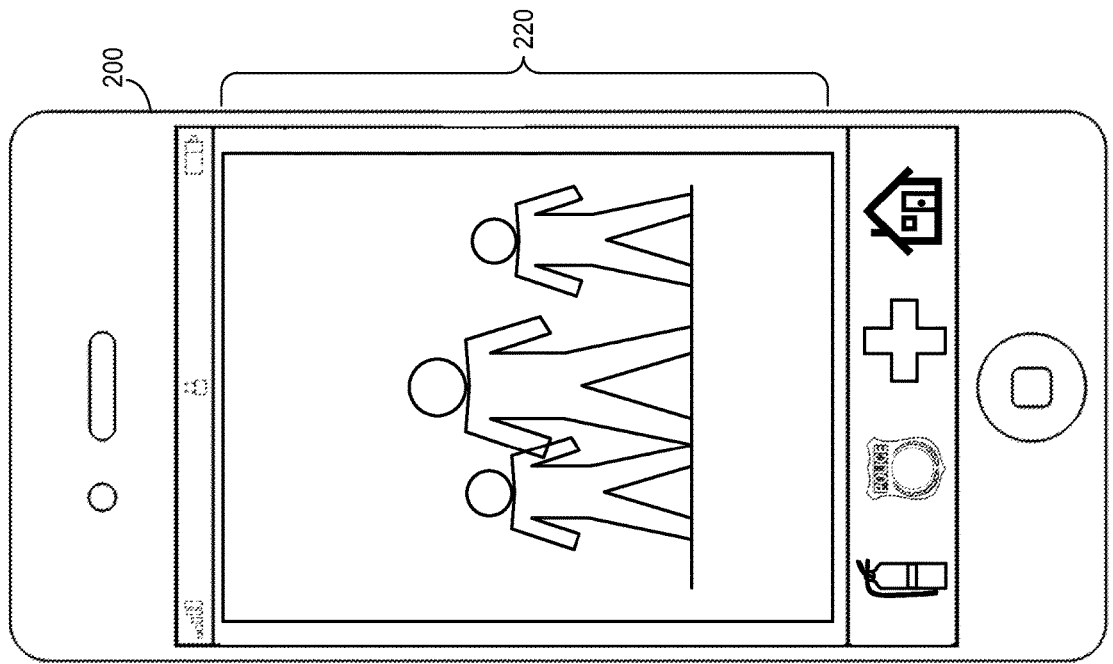
FIGS. 2A, 2B, 2C, and 2D illustrate example interfaces which can be displayed on a client device, such as the client device illustrated in FIG. 1, and from which a user can initiate communications.
Figure 2A:
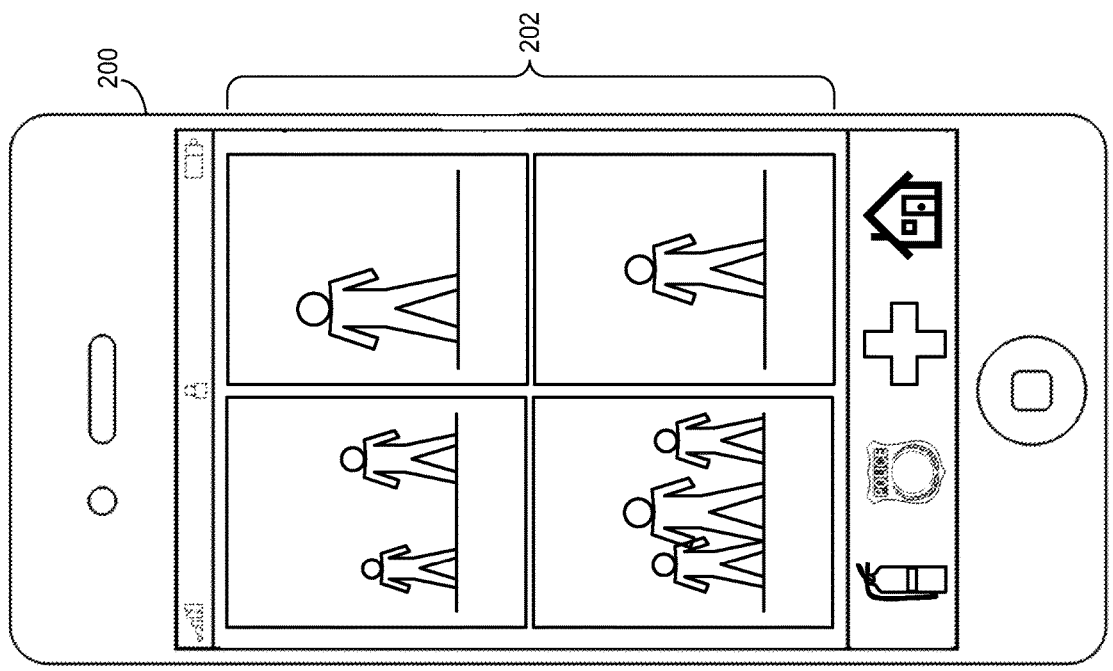

FIG. 2A illustrates a gallery interface 202 which may be displayed on the client device 200. The gallery interface 202 may present, to a user of the client device 200, multiple images (e.g., arranged as "tiles") such that the user may "scroll" through the multiple images (e.g., via swiping gestures on a touchscreen) to view the multiple images. For example, the gallery interface 202 may present images captured by the client device 200 (e.g., with a built in camera) or downloaded to the client device 200 from websites, documents, text messages, social media posts, etc. Although each of the images in the example gallery interface 202 depicts people, images presented in gallery interfaces may generally include any subject matter.

As the user is viewing the multiple images via the gallery interface 202, the user may wish to view a certain image at a larger size than the size of the certain image in the gallery interface 202. As such, a user may select (e.g., with a click or tap) the image, and the client device 200 may present a single-image interface 220 to the user, as depicted in FIG. 2B. In the single-image interface 220, a selected one of the multiple images displayed in the gallery interface 202 may be displayed over a majority of the screen of the client device 200.

In the first scenario, at least some of the images presented in the gallery interface 202 and/or the single-image interface 220 include images of people (e.g., friends or family of the user). In such cases, a user may select a face or other pictured portion of a certain person to initiate a communication with that person. As illustrated in FIG. 2C, the user may select a face of one of the people pictures in the single-image interface 220, as illustrated by the selected area 222. In some implementations, the user may select the selected area 222 by a gesture or other interaction with the client device 200 that is specifically utilized to initiate communications with people or other entities associated with images. For example, the user may utilize a touch-screen gesture, such as a tap and hold (e.g., holding the selected area 222 for a pre-determined amount of time), swipe in one or more directions, double tap, etc. gesture, that is different from other touchscreen gestures utilized for other functions on the client device 200, such as a tap, pinch, etc. Generally, however, an interface may utilize any suitable user interactions to initiate communications with people or other entities associated with images, such as in the second scenario.

The selected area 222 (e.g., the face of person pictured in the image) may be associated with a certain contact of the user. For example, the image to contact connection routine 118 and/or the association recording and providing routine 136 may store an association between the selected area 222 and a certain contact (e.g., a certain family member or friend of the user), where the certain contact has contact information stored in the contact records 120, for example. Such associations may be based on previous detections of distinct areas (e.g., via facial recognition techniques) and previous user interactions, as further discussed with reference to FIG. 8, or may be based on previously detections of distinct areas similar to reference images, as discussed further with reference to FIG. 10.

Figure 2D:
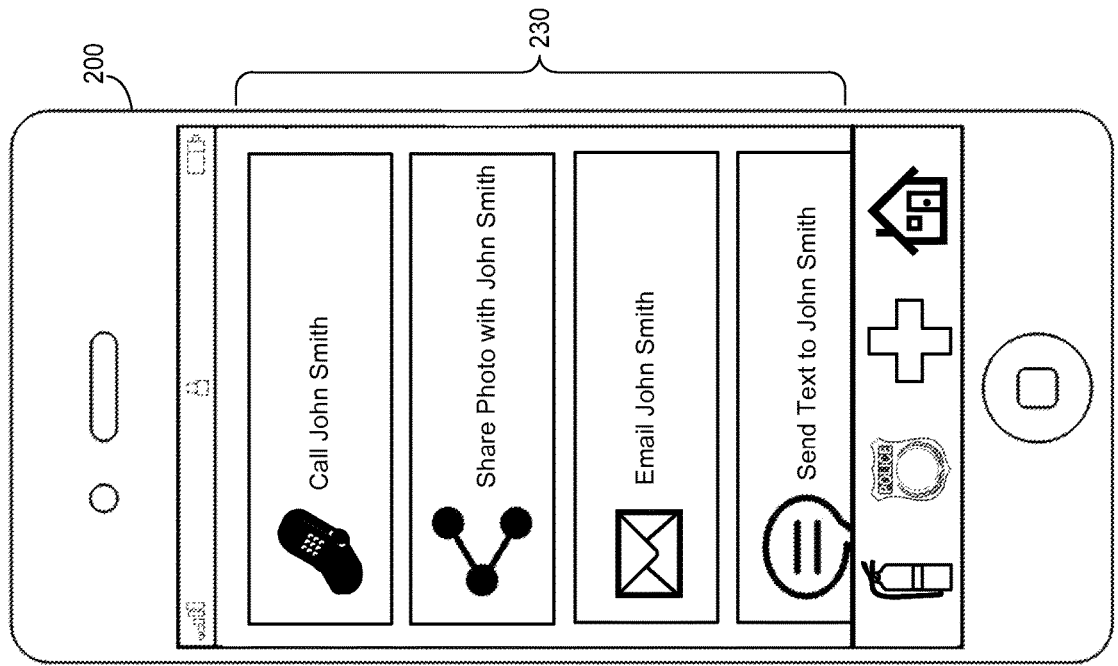
Figure 2C:
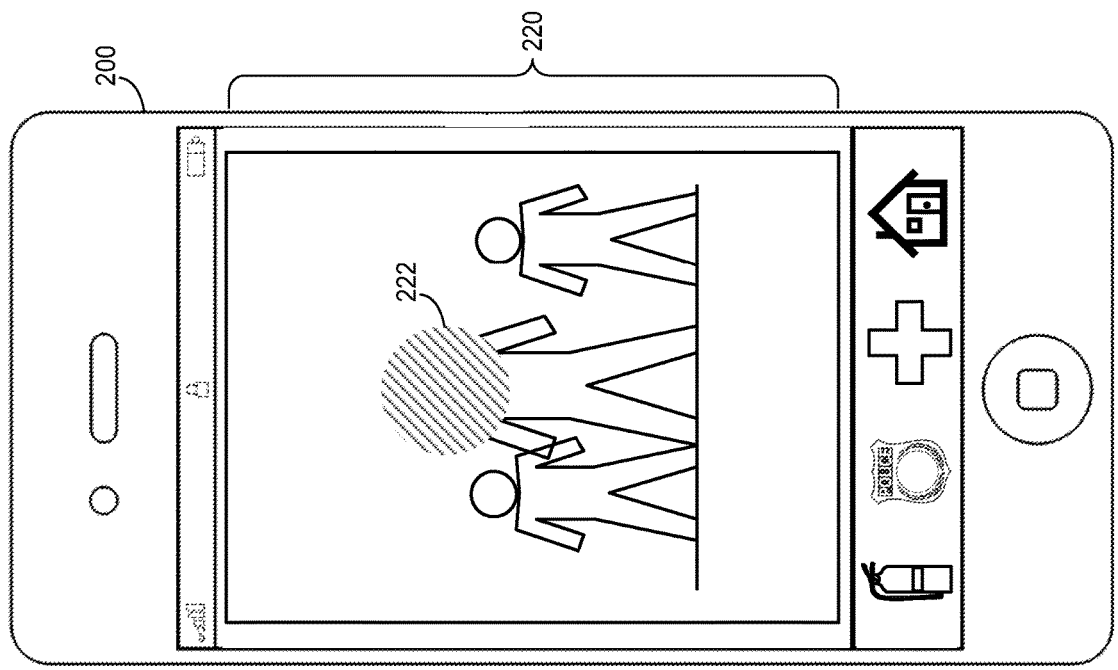

When the user selects the selected area 222, the client device 200 may present a list of selectable communication types 230 to the user, as illustrated in FIG. 2D. That is, the client device 200 may present the user with a variety of options for communicating with the person associated with the selected area 222. In the first scenario, the selected area 222 may be associated with a contact of the user named "John Smith," which association may be indicated by data stored in the memory 112 or the data storage device 142. In this scenario, the list of selectable communication types 230 may include options of calling "John Smith," sharing the photo with "John Smith" via a social media service, emailing "John Smith," sending a text message to "John Smith," etc. based on contact information about "John Smith" stored on the client device 200, such as telephone numbers, social media usernames, email addresses, etc.

In some implementations, such as those illustrated in FIGS. 2A, 2B, 2C, and 2D, a user does not have to interrupt a normal workflow (e.g., of viewing images) to initiate a communication with a contact. Rather, the user may easily and seamlessly initiate communications when prompted to do so by a certain image. Moreover, elderly or handicapped users may easily initiate communications from an intuitive and visual interface, such as a gallery of images, without having to scroll through or otherwise navigate a lengthy list of contacts.

Figure 3:
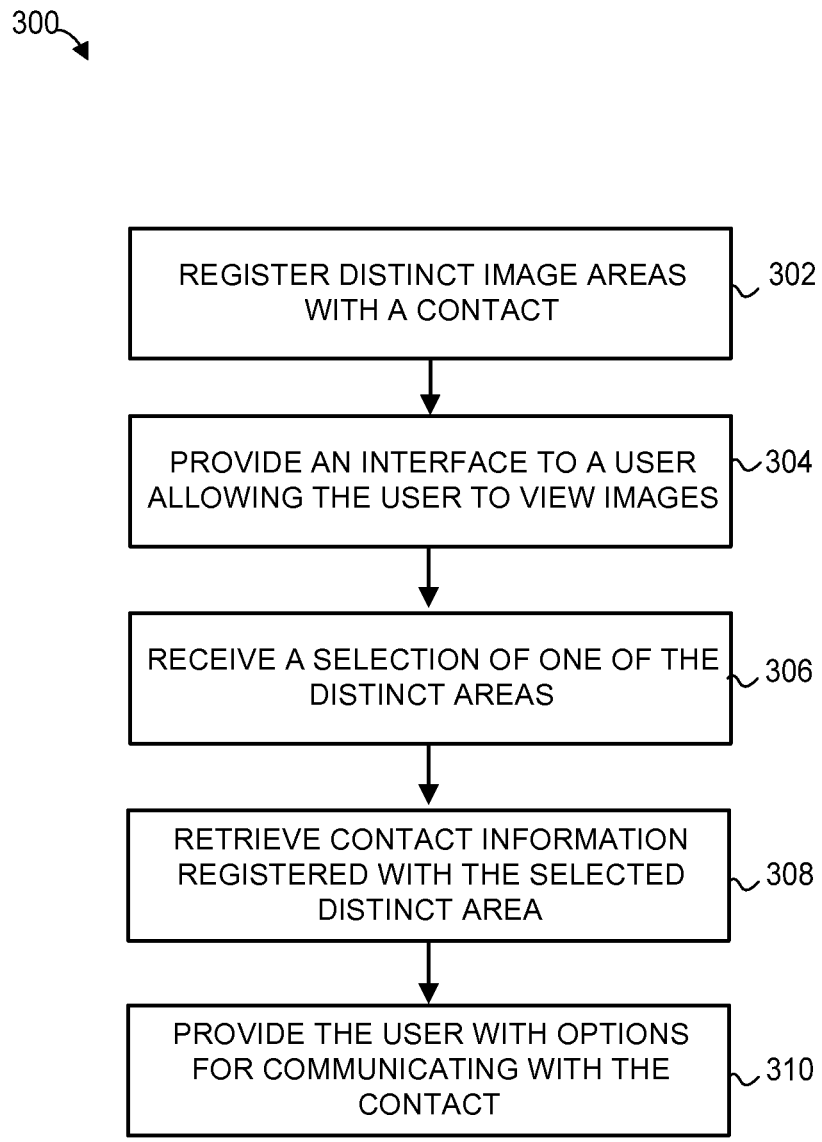
FIG. 3 is a flow diagram of an example method for initiating communications with a contact based on user interactions with images which can be implemented in the computing environment illustrated in FIG. 1.

FIG. 3 is a flow diagram of an example method 300 for initiating communications with a contact based on user interactions with images corresponding to the contact. The method 300 may be implemented by any suitable combination of the client devices 102a and 102b and the image-based connection server 130 including any one of the client devices 102a and 102b and the image-based connection server 130 acting as a standalone device, for example.

First, distinct areas within one or more images may be registered with a certain contact (block 302), such as an individual (e.g., a friend, family member, coworker, or other acquaintance of a user) or other entity (e.g., a business or other organization). Registering the images may include, among other things, detecting or recognizing distinct areas within images, receiving indications from users that detected distinct areas are to be associated with certain contacts, and storing indications of associations between distinct areas and contacts, in an implementation. Such registering or associating of distinct areas within images is further discussed with reference to FIGS. 8 and 10.

Returning to FIG. 3, an interface is presented to a user in which the user may view the one or more images (block 304). The interface may be, as illustrated in FIGS. 2A, 2B, and 2C, a multiple or single image "gallery" in which a user can view captured or downloaded images. However, generally, the interface may include any interface of an application executing on a client device in which images are displayed to a user. For example, the interface may include a web browser, an interface of a social media application, a photo and/or video editing application, a photo and/or video sharing application, a mapping application, a news application, a weather application, etc.

Figure 4B:
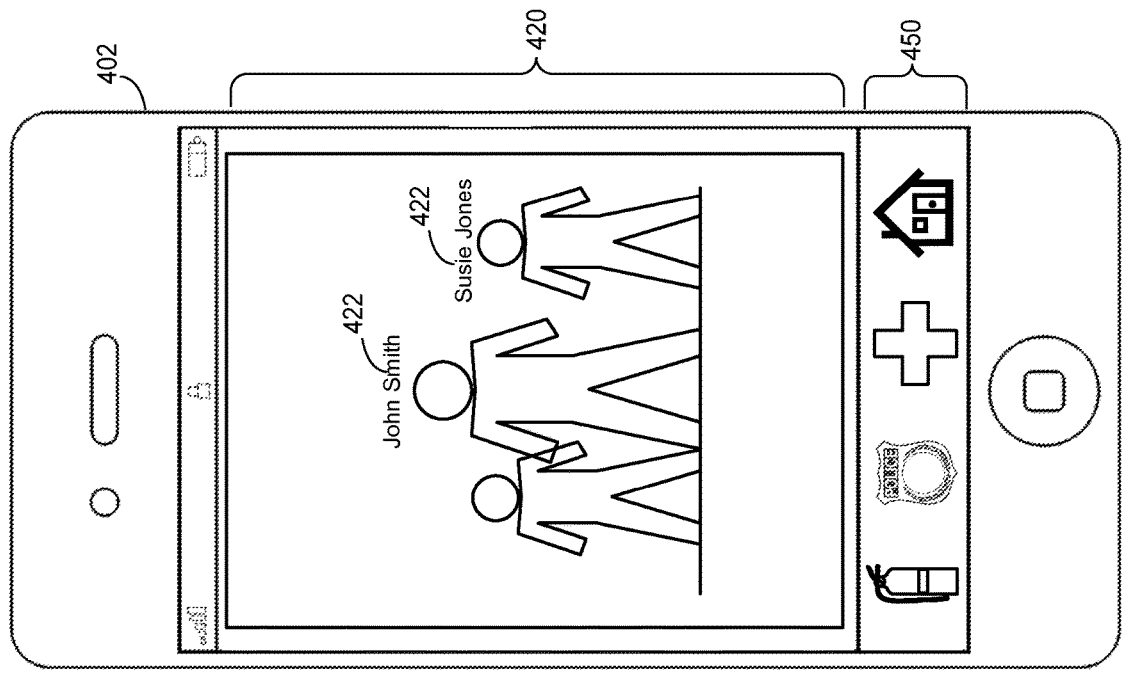
FIGS. 4A and 4B illustrate example labeled or highlighted interfaces which can be displayed on a client device, such as the client device illustrated in FIG. 1.
Figure 4A:
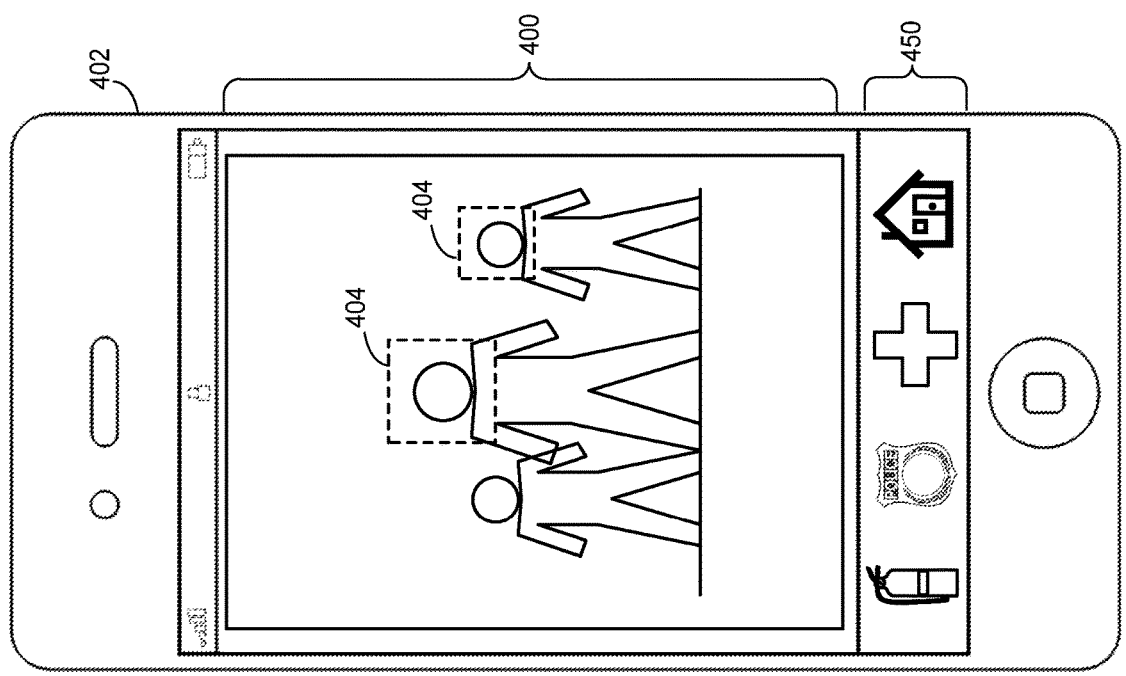

Although not illustrated in FIGS. 2A, 2B, and 2C, some interfaces may emphasize selectable distinct areas within images via one or more visual elements overlaid or embedded within the images. FIGS. 4A and 4B illustrate example interfaces 400 and 420 (displayed by a client device 402), respectively, including one or more visual elements that highlight selectable distinct areas within images. Specifically, FIG. 4A illustrates one or more boxes 404 and FIG. 4B illustrates one or more textual labels 422. Generally, interfaces may highlight distinct selectable areas within images via any combination of overlaid or embedded shapes, text, colors, textures, etc.

A selection of a distinct area within one of the images displayed in the interface is received (block 306). As discussed further with reference to FIG. 2C, a user may click or tap on the face of a person within an image to initiate a communication with that person, in the first scenario. Generally, a user may utilize any suitable user interface interactions to select any distinct and registered area within an image to initiate a communication with a person or an entity (e.g., a business).

Contact information is then retrieved for a contact associated with the selected distinct area (block 308). In some implementations, a client device, such as one of the client devices 102a and 102b, may retrieve contact information based on stored indications of the associations and stored contact information on the client device (e.g., within the contact records 120). In other implementations, a client device may communicate with any number of remote computing devices (e.g., the image-based connection server 130) to retrieve contact information associated with registered distinct areas. That is, client devices may, in some implementations, not locally store data indicative of associations between contacts and distinct areas with images or data including contact information (e.g., telephone numbers) for contacts. Rather, client device may retrieve such data from remote computing devices, or servers, in an implementation.

Once the contact information is retrieved, a list of options for communicating with the contact is presented to the user (block 310). For example, as illustrated in FIG. 2D, a client device may display a list of options including options to call, text, email, etc. the contact associated with the selected distinct area.

Although, FIGS. 2A, 2B, and 2D emphasize distinct areas corresponding to the faces of people within distinct areas, other images may be displayed on a client device with associations to other entities or organizations. In some implementations, users of a client device may customize one or more interfaces of the client device to display certain icons or images allowing the user to quickly communicate with certain contacts without having to navigate a contact list, utilize a keypad to dial a number, etc. FIGS. 4A and 4B illustrate example icons 450 displayed within the interfaces 400 and 420.

The icons 450 may be registered or associated with certain contacts, such that, when selected, a communication is initiated with the certain contacts or an interface is presented to a user such that the user can easily initiate a communication. In some implementations, the icons 450 may be associated with one or more emergency contacts, such as local police contacts, emergency medical contacts, insurance contacts, fire departments, etc. In general, however, the icons 450 may include be associated with any suitable contacts, such as family members frequently contacted by a user, businesses frequently contacted by a user, etc. Thus, the icons may allow elderly or handicapped individuals to easily and quickly communicate with important contacts without having to navigate a contact list, utilize a keypad of a phone, etc.

In some implementations, the icons 450 may be customizable by a user of the client device 402. A user may select, download, or otherwise retrieve certain images to be utilized as the icons 450, and the user may associate any contacts and/or types of communication (phone, email, etc.) with the icons 450, for example. Although four icons 450 are illustrated in FIGS. 4A and 4B, any suitable number of icons may be utilized by a client device. Further, the icons 450 may be displayed at any suitable locations within interfaces of client devices, such as along the top or side of interface, in expandable menus that expand upon "hovering" over certain areas of interfaces, etc.

Figure 5C:
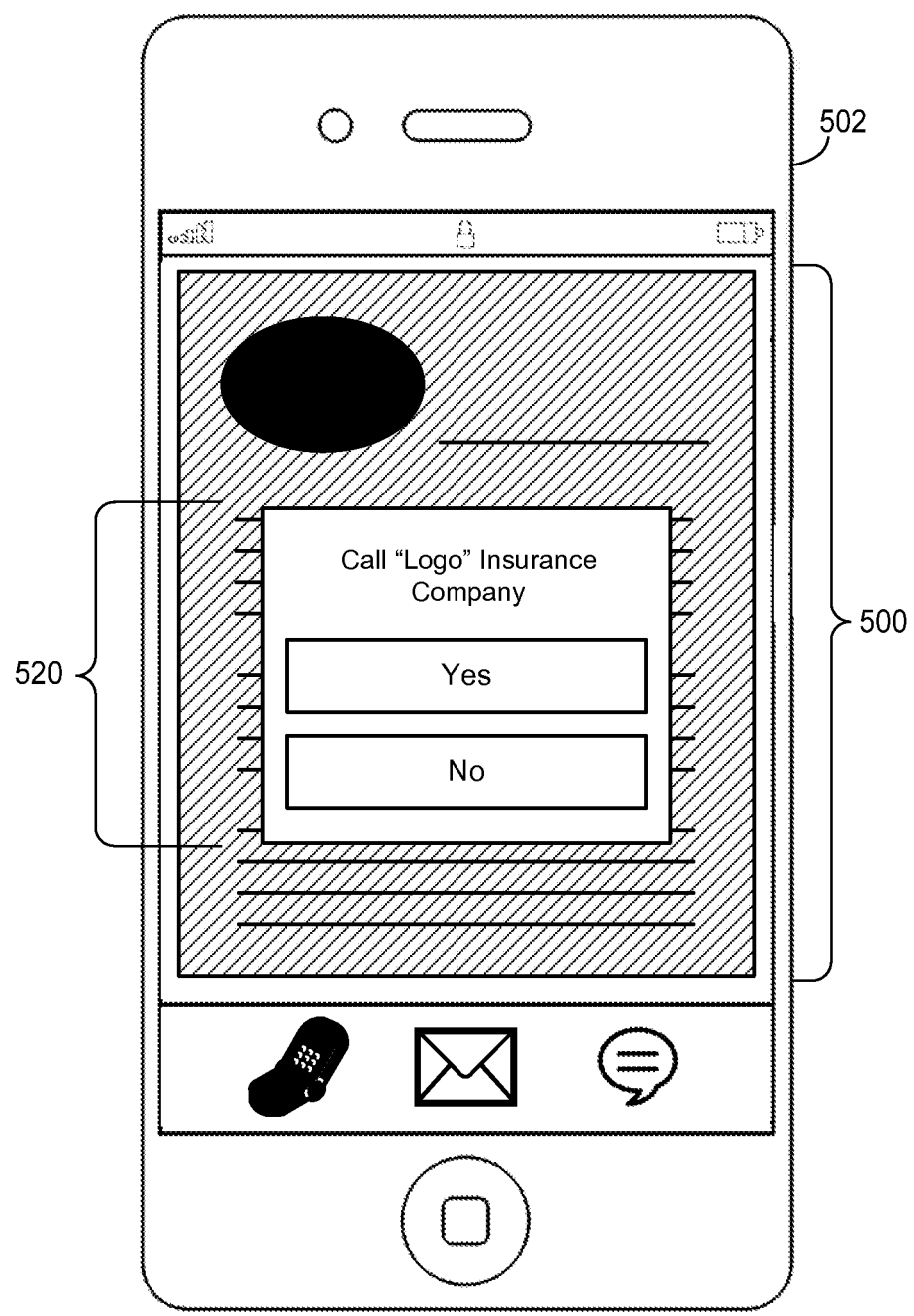

FIGS. 5A, 5B, and 5C illustrate another interface 500 (displayed on a client device 502) in which another type of image is registered with a contact, such that a user may communicate with the contact by selecting the image. The interface 500 may, for example, be a web browser interface in which a webpage is displayed, or the interface 500 may be an application in which a document (e.g., a PDF document or a scanned document) is displayed. In any event, the content displayed within the interface 500 includes a logo 504 associated with a contact. The contact may, for example, be a business corresponding to the logo 504, such as an insurance company, a car company, a computer company, etc., or any other organization with a registered (i.e., registered or associated with a contact) logo, such as a government organization, non-profit organization, club, university, etc.

The client device 502 may, when the logo 504 is selected (as illustrated by the selected area 506 in FIG. 5B), initiate a communication with the entity (e.g., business) corresponding to the logo 504. For example, the client device 502 may, upon selection of the logo 504, display a box 520, as illustrated in FIG. 5C, in which a user may confirm a choice to communicate with the entity corresponding to the logo 504 via a phone call. However, in some implementations, the client device 502 may automatically initiate a communication, such as a phone call, upon selection of the logo 504 or may display other suitable interfaces, such as an interface similar to the interface 230.

Registering or Associating Images with Contacts

Figure 6:
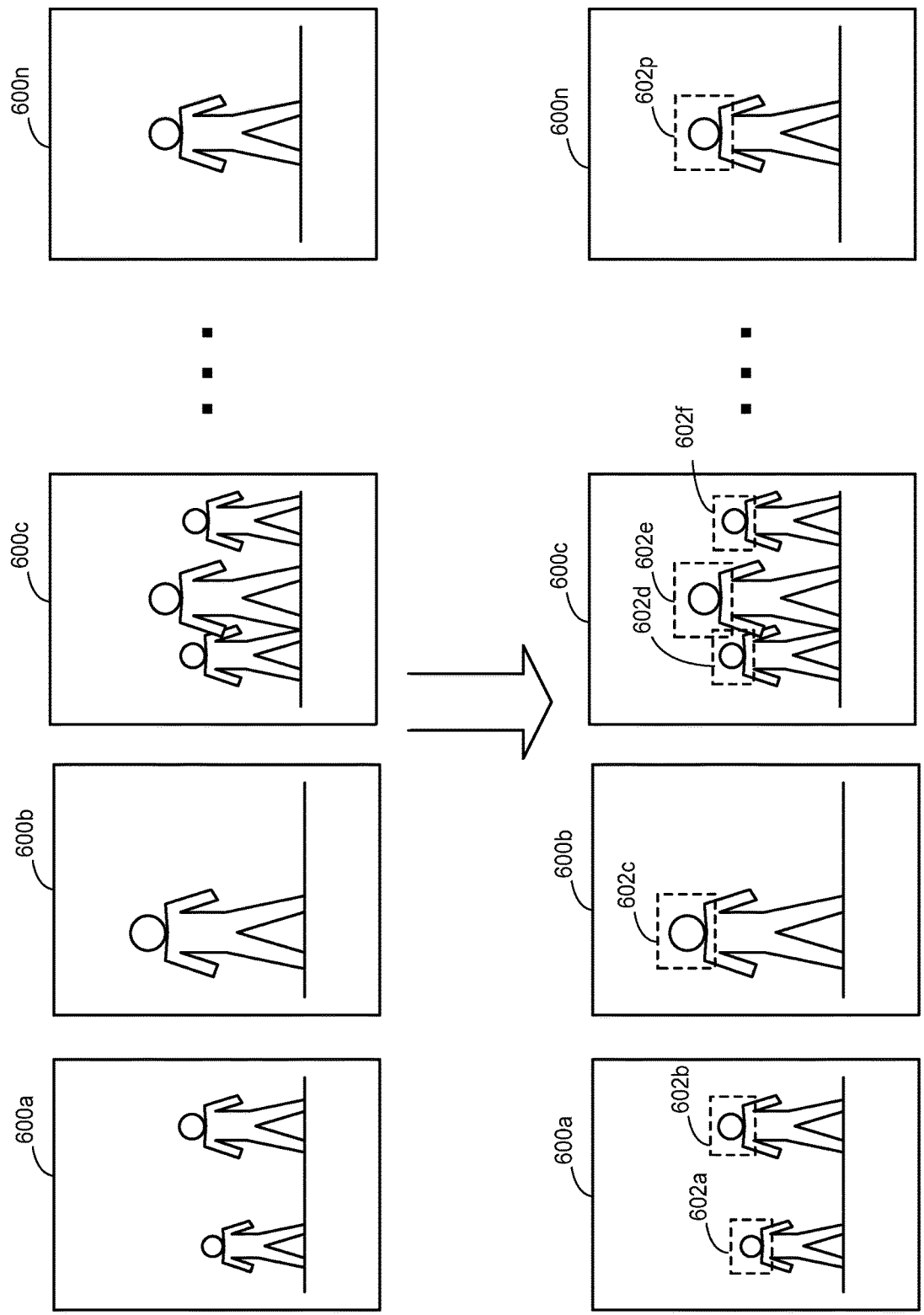
FIG. 6 illustrates a detection of distinct areas within a plurality of images which can be implemented by components of the computing environment illustrated in FIG. 1.

FIG. 6 illustrates a detection of distinct areas 602a-602p within a plurality of images 600a-600n (e.g., utilized in the first scenario). The client devices 102a and 102b and/or the image-based connection server 130 may implement functionality to perform the detection of the distinct areas 602a-602p, for example.

In the first scenario, the client devices 102a and 102b and/or the image-based connection server 130 may implement one or more algorithms (e.g., in the client recognition routine 116 and/or in the server recognition routine 134) to detect faces of people pictured in the images 600a-600n. In such a case, the distinct areas 602a-602p may include portions of the images 600a-600n including faces of people. For example, the client devices 102a and 102b and/or the image-based connection server 130 may implement rule-based facial recognition methods based on known relationships between facial features (e.g., relative locations of eyes, nose, and mouth). Algorithms implemented by the client devices 102a and 102b may also account for variations in lighting, viewpoint, locations of facial features, etc. such that the algorithms are "feature invariant."

In some implementations, a first algorithm implemented by the client devices 102a and 102b and/or the image-based connection server 130 may detect the locations of distinct objects, such as faces or logos, within images, documents, webpages, etc. without distinguishing between the distinct areas themselves. That is, as depicted in FIG. 6, the client devices 102a and 102b and/or the image-based connection server 130 may detect the locations (e.g., represented in pixel or other dimensions) of all faces within the plurality of images 600a-600n and/or respective areas covered by the faces. Subsequently, a second algorithm implemented by the faces. The client devices 102a and 102b and/or the image-based connection server 130 may recognize particular faces. However, it is understood that a single or any other number of algorithms (three, four, etc.) may implement such functionalities.

Figure 7:
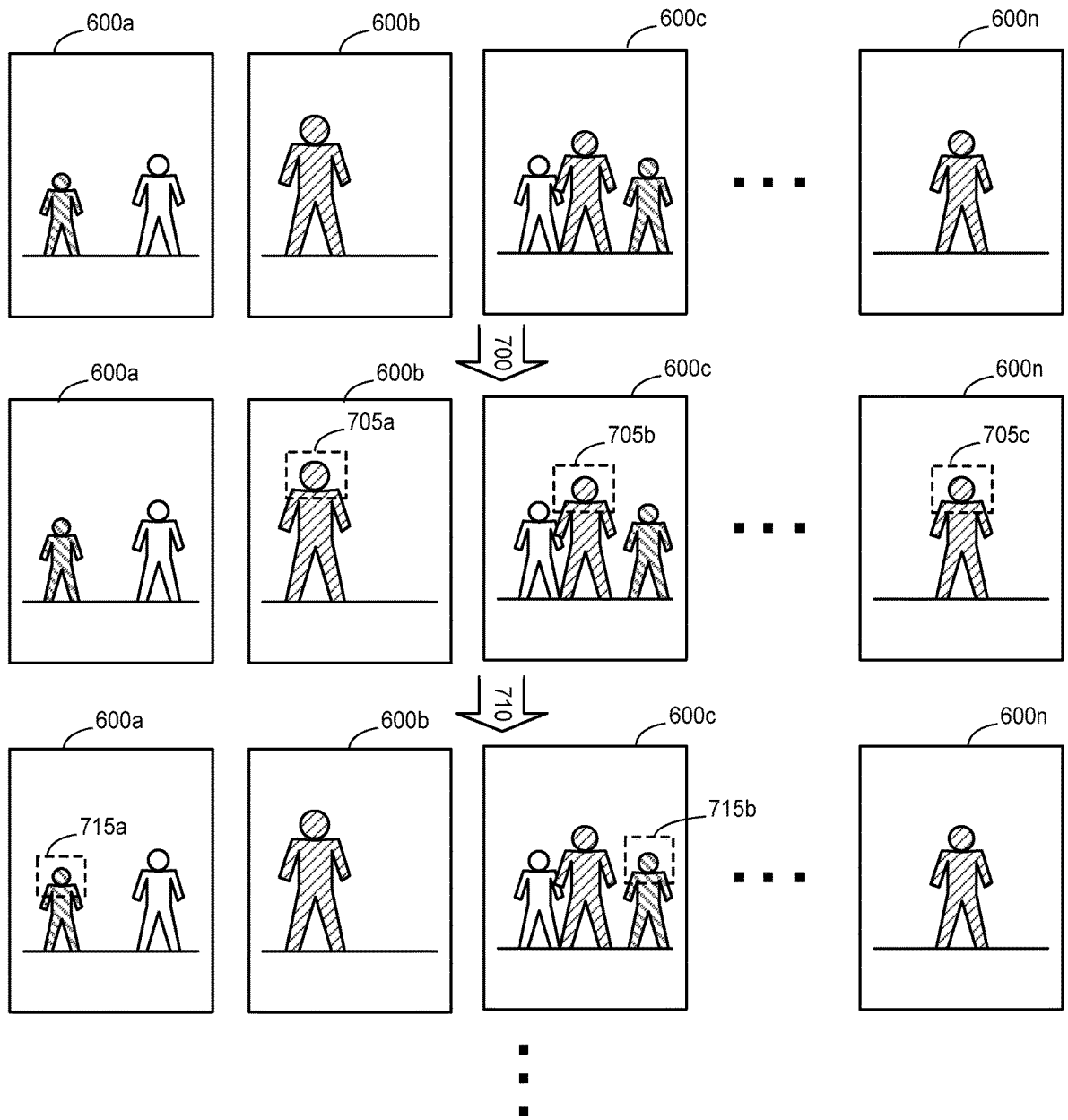
FIG. 7 illustrates another detection of distinct areas within a plurality of images which can be implemented by components of the computing environment illustrated in FIG. 1.

FIG. 7 illustrates another detection or recognition of particular ones of the distinct areas 602a-602n in the images 600a-600n (e.g., utilized in the first scenario). The client devices 102a and 102b and/or the image-based connection server 130 may implement functionality to perform the detection of the particular ones of the distinct areas 602a-602n in place of or along with detections similar to the detection illustrated in FIG. 6, for example.

In particular, the client devices 102a and 102b and/or the image-based connection server 130 may implement one or more algorithms to detect a number of particular faces of people pictured in the images 600a-600n, in the first scenario. That is, the algorithms implemented by the client devices 102a and 102b and/or the image-based connection server 130 may identify all areas 705a, 705b, and 705c corresponding to faces of a first person (in a first step 700), all areas 715a and 715b corresponding to faces of a second person (in a second step 710), etc. Of course, the client devices 102a and 102b and/or the image-based connection server 130 may identify any number of distinct areas (including areas picturing objects other than faces) in any number of steps.

To detect particular distinct areas within images, which areas are similar to one another (e.g., faces of a single person), the client devices 102a and 102b and/or the image-based connection server 130 may implement template (e.g., reference image) or appearance based facial recognition methods. For example, the client devices 102a and 102b and/or the image-based connection server 130 may detect a first face within a first image (e.g., as depicted in FIG. 6) and subsequently utilize that first face as a reference face to detect a group of similar faces (i.e., faces of the same person) in other images. Alternatively or additionally, the client devices 102a and 102b and/or the image-based connection server 130 may utilize learning or classification algorithms (e.g., trained on a set of training data) to near simultaneously detect faces within images and group the faces into groups of similar faces, each group corresponding to a single person.

By way of example and without limitation, the client devices 102a and 102b and/or the image-based connection server 130 may implement shape template, active shape model, eigenvector decomposition and clustering, distribution-based, neural network based, support vector machine, Bayes classifier, hidden Markov model, or information-theoretical based algorithms to detect and/or recognize certain distinct areas within images. Generally, any combination of these or other suitable facial recognition or computer vision techniques may be utilized by the client devices 102a and 102b and/or the image-based connection server 130.

Figure 8:
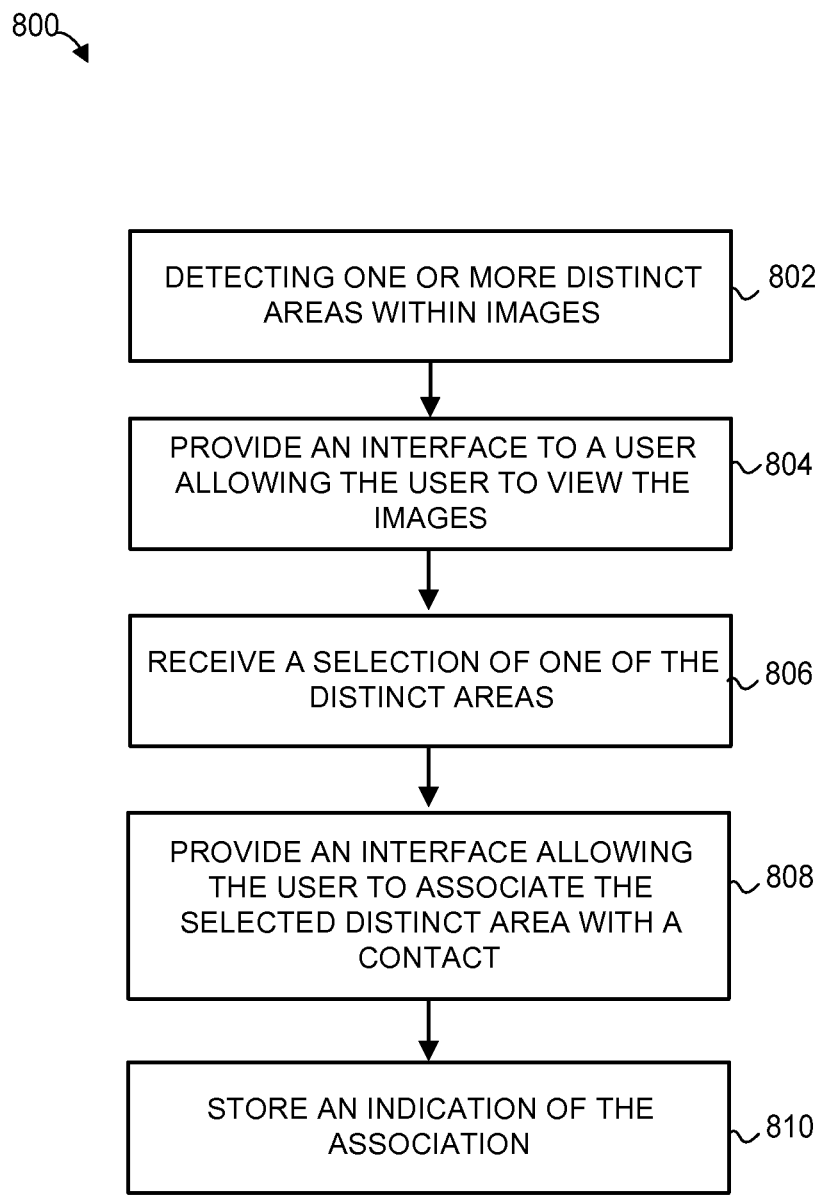
FIG. 8 is a flow diagram of an example method for registering detected areas within images with a contact which can be implemented in the computing environment illustrated in FIG. 1.

FIG. 8 is a flow diagram of an example method 800 for registering detected areas within images with a contact. The method 800 may be implemented by any suitable combination of the client devices 102a and 102b and/or the image-based connection server 130 to facilitate the first scenario, for example.

First, distinct areas within images are detected (block 802). As described further above with reference to FIG. 6 and, the client devices 102a and 102b and/or the image-based connection server 130 may implement a number of computer vision algorithms to detect or recognize distinct areas, such as faces, other portions of a human body, entire human bodies, objects, logos, icons, etc., within images. When detected, algorithms implemented by the client devices 102a and 102b and/or the image-based connection server 130 may store indications of the detected distinct areas in the memory 112, the memory 132, the data storage device 142, or a combination thereof, in an implementation. For example, the algorithms may output and/or store locations (e.g., in pixel values), dimensions, labels (e.g., "face1," "face2," etc. or "logo1," "logo2," etc.), etc. of distinct areas within the images.

An interface is then provided to a user of a client device allowing the user to view images in which the distinct areas have been detected (block 804). For example, the interface may include a gallery or single-image interface similar to the interfaces depicted in FIGS. 2A, 2B, and 2C. In some cases, the interface may also highlight the detected distinct areas within the images in a manner similar or dissimilar to that depicted in FIGS. 4A and 4B.

A selection of one of the displayed distinct areas is received (block 806). A user may click, tap, utilize a gesture, etc. to select one of the displayed distinct areas. Subsequently, another interface may be presented to the user in which the user may associate the selected distinct area with a certain contact (block 808). For example, the client device 102a may present a user with an interface displaying at least some of the contact information (e.g., names, phone numbers, email addresses, etc.) included in the contact records 120. In such a case, a user may scroll through the contact information and select a particular contact (e.g., by name "John Smith") to associate the particular contact with the selected distinct area. An indication of the association may then be stored (e.g., by the image-to-contact connection routine 118 or the association recording and providing routine 136 in the memory 112 or the data storage device 142) (block 810).

Further, the client devices 102a and 102b and/or the image-based connection server 130 may recognize all other distinct areas within a plurality of images that are substantially similar to the selected distinct area. Data indicating a similar association between these distinct area and the particular contact may also be stored.

In this manner, the client devices 102a and 102b and/or the image-based connection server 130 may store associations between particular detected or recognized distinct areas such that subsequent users (e.g., elderly or handicapped users) may easily initiate communications (e.g., via the method 300), in an implementation. Although the example method 800 illustrates an association of a single contact with one or more distinct areas, the method 800 may be repeated and or otherwise adjusted such that user may sequentially or near simultaneously associate groups of distinct areas with multiple contacts.

Figure 9:
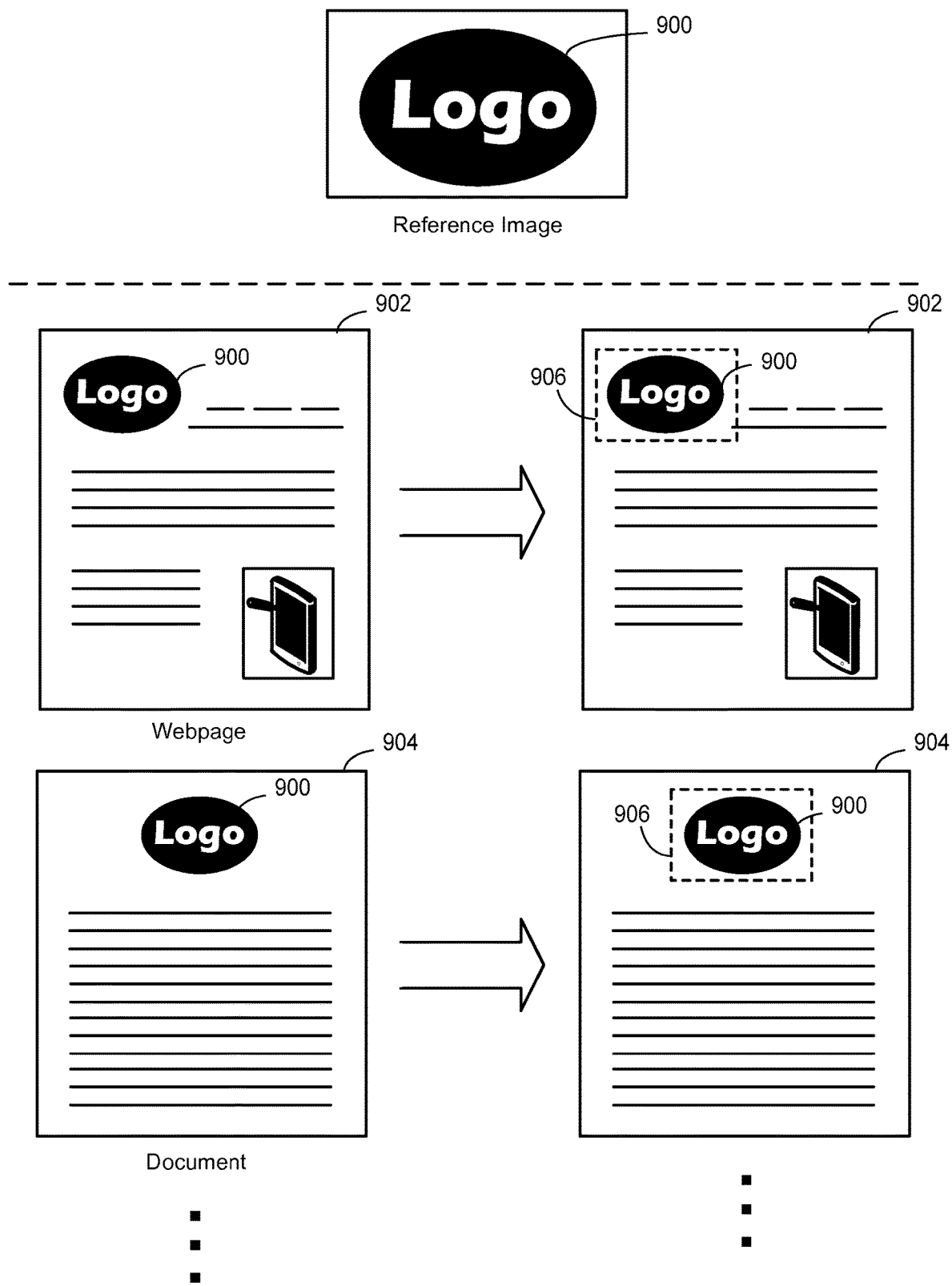
FIG. 9 illustrates yet another detection of distinct areas within a plurality of images which can be implemented by components of the computing environment illustrated in FIG. 1.

Although the detection of faces in emphasized in FIGS. 6 and 7, any areas of images picturing distinct objects or features may be detected or recognized in images by the client devices 102a and 102b and/or the image-based connection server 130. FIG. 9, for example, illustrates a detection or recognition of a logo 900 within a webpage 902 and another document 904, such as a PDF file or scanned document. In the example recognition of the logo 900 illustrated in FIG. 9, the client devices 102a and 102b and/or the image-based connection server 130 may utilize a reference-image based technique to detect the logo 900 in the webpage 902 and the document 904, as described with reference to the second scenario. That is, algorithms utilized by the client devices 102a and 102b and/or the image-based connection server 130 may compute correlations between a reference image 910 of the logo 900 and images or portions of images within the webpage 902 and the document 904. The algorithms may identify areas 906 with high correlations as instances of the logo 900.

Figure 10:
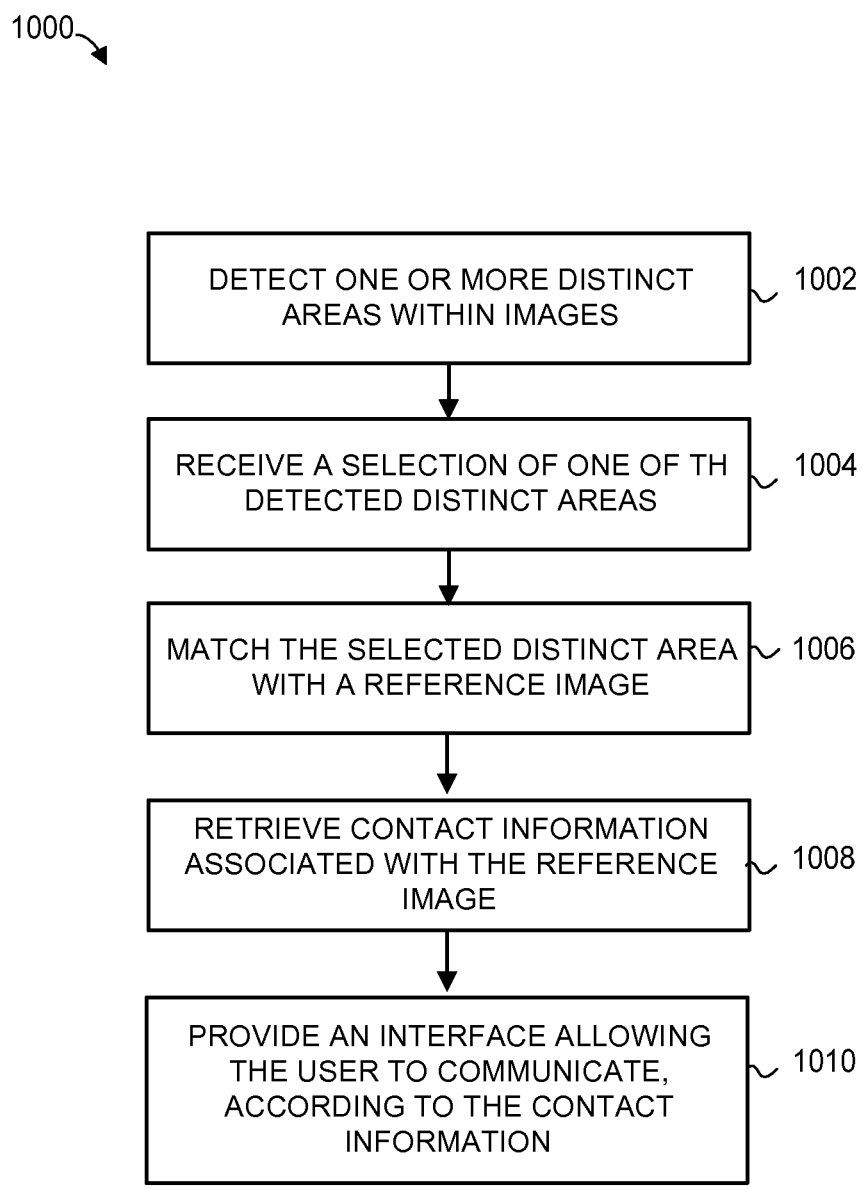
FIG. 10 is a flow diagram of an example method for detecting or recognizing distinct areas within images based on a reference image which can be implemented in the computing environment illustrated in FIG. 1.

FIG. 10 is an example method 1000 for detecting or recognizing distinct areas within images based on a reference image. The method 800 may be implemented by any suitable combination of the client devices 102a and 102b and/or the image-based connection server 130 to facilitate the second scenario, for example.

One or more distinct areas may be detected within images (1002). For example, a user may view or otherwise actively interact with a document (e.g., PDF, word processing, spreadsheet, etc. document), image, scanned file (letter, form, advertisement, page of a magazine, etc.), etc. (referred to below as simply the "particular document") on a device, such as the client device 102a. When viewed or actively interacted with on the client device 102a, the client device 102a (e.g., via the client recognition routine 116) or the image-based connection server 130 (e.g., via the server recognition routine 134) may identify one or more distinct areas within the particular document. The distinct areas may correspond to logos, titles, blocks of text, images of particular objects, etc., but, in some implementations, the client device 102a or the image-based connection server 130 may only detect distinct areas at block 1002. That is, the client device 102a or the image-based connection server 130 may not identify what each of the distinct areas represents, in the implementations. The client device 102a or the image-based connection server 130 may only detect the distinct areas.

A selection of one of the distinct areas is received (block 1104). A user of one of the client device 102a or 102b may select (e.g., click or tap on) one of the distinct areas within an interface in which the images (including the distinct areas) are displayed. For example, the user may select the distinct area within a document viewer (e.g., word processor), PDF viewer, web browser, etc. by clicking on the distinct area with a mouse or by tapping the distinct area on a touchscreen. In some scenarios, the user may select the distinct area from any number of applications without interrupting a normal workflow of the applications (e.g., without exiting the applications).

The selected distinct area may be matched or correlated with a reference image (block 1006). For example, correlations between texture, color, edges, text, etc. within the reference image and similar features within the detected distinct areas may be computed by the client devices 102a and 102b and/or the image-based connection server 130. The reference image may be an image stored in the reference images 140, and the client devices 102a and 102b and/or the image-based connection server 130 may retrieve the reference image from the reference images 140 when comparing the reference image to the selected distinct area. A reference image having substantially similar features to the selected distinct area may be considered to match the reference image. In some implementations, if no matching reference image is found, the method 1000 may include notifying the user that no contact or interaction information is available for the selected distinct area.

In some implementations, the client devices 102a and 102b and/or the image-based connection server 130 may compare the selected distinct area with all of the reference images 140 stored in the image to contact database 142. In other implementations, the client devices 102a and 102b and/or the image-based connection server 130 may compare the selected distinct area with only some of the reference images 140. For example, the client devices 102a and 102b and/or the image-based connection server 130 may sequentially compare the selected distinct area within the particular document to the reference images 140 until a match is found to a particular one of the reference images 140 or until the selected distinct area is compared with all of the reference images 140. In other cases, the client devices 102a and 102b and/or the image-based connection server 130 may compare the selected distinct area with two or more of the reference images 140 in parallel (e.g., simultaneously). In still other examples, the client devices 102a and 102b and/or the image-based connection server 130 may compare the selected distinct area with only some of the reference images, and/or the client devices 102a and 102b and/or the image-based connection server 130 may narrow the reference images by one or more detected features of the selected distinct area (e.g., narrowing the reference images 140 to only black and white images, to only images including round features, to only images including a certain number of edges, etc.).

Upon matching the selected distinct area to the reference image, contact or interaction information is retrieved (block 1008), where the contact or interaction information corresponds to the reference image. The reference image may be registered, for example, according to the example method 800 or another suitable method to associate the reference image with an entity, such as a person or business. The connection information 144 may indicate the association, and, thus, the client devices 102a and 102b and/or the image-based connection server 130 may retrieve at least some of the connection information 144. In some implementations, the connection information 144 may itself list contact and/or interaction information (addresses of webpages, email addresses, phone numbers, social media accounts, etc.) facilitating communications or interactions with an entity corresponding to the reference image. In other implementations, portions of the connection information 144 may point to other data indicating the contact or interaction information. For example, the connection information 144 may indicate that the reference image corresponds to a customer service phone number of a business, and, based on that indication, the client devices 102a and 102b and/or the image-based connection server 130 may retrieve the customer service phone number of the business from separate contact records, such as the contact records 120, or from publically available contact records (e.g., available via the Internet).

In some implementations, the retrieved contact information at block 1008 of method 1000 may be retrieved based on correspondences with the matched reference image and based on additional information. The connection information 144 may associate the reference image, with which the selected distinct area is matched, with multiple different types and/or numbers of contact records. For example, for a single reference image, the connection information 144 may list multiple phone number, multiple websites, multiple email addresses, etc. Then, based on additional information specific to the device (e.g., client device 102a) and/or user, the image-based connection server 130 may retrieve only certain of the multiple phone number, multiple websites, multiple email addresses, etc. to utilize in providing the user with contact/interaction options. In one scenario, the selected distinct area may be a logo of a business, and the image-based connection server 130 may retrieve associated contact records from the connection information 144 including multiple phone numbers for the business. The image-based connection server 130 may also retrieve location information from the client device 102a indicating a current location (e.g., via GPS coordinates) of the client device 102a. Utilizing the multiple phone numbers and the current location, the image-based connection server 130 may provide the user with an option to communicate with the business via only one of the multiple phone numbers, where the one of the multiple phone numbers corresponds to a branch or office of the business that is proximate to the current location. Generally, the image-based connection server 130 may retrieve and/or select certain contact records based on associations with a reference image and based on technical capabilities of a client device (e.g., ability to text message or ability to browse the Internet), current or past geographical locations of a client device, current or past communications or interactions initiated by a client device, or other suitable properties of the client device.

An interface may then be provided to a user to allow the user to communicate with the contact (associated with the matched reference image) or otherwise interact with the contact (block 1010). For example, the client devices 102a and/or the image-based connection server 130 may cause an interface substantially similar to that illustrated in FIGS. 5A, 5B, and 5C to be presented on the client device 102a.

Although the method 1000 indicates that a plurality of distinct areas are detected within an image, one distinct area is selected, and the one distinct area is matched with one reference image, implementations may allow multiple of the detected distinct areas to be matched with one or more reference images. For example, the image-based connection server 130 may match every, or at least more than one, detected distinct area with a corresponding reference image. The image-based connection server 130 may then cause an interactive version of the particular document to be displayed to a user allowing the user to select any number of the detected distinct areas, which distinct areas are already matched to reference images. In another example, the image-based connection server 130 may match one or more selected distinct areas with multiple reference images (e.g., stored in the reference images 140).

Additional Considerations

Upon reading this disclosure, those of ordinary skill in the art will appreciate still additional alternative structural and functional designs for system and a method for assessing the performance of particular operators of vehicles or machines. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention. By way of example, and not limitation, the present disclosure contemplates at least the following aspects:

1. A computer-implemented method comprising:
detecting, by one or more processors, a distinct area within an image;
comparing, by the one or more processors, detected features of the distinct area within the image to reference features corresponding to a reference image;
determining, by the one or more processors, that the detected distinct area matches the reference image based on the comparison between the detected features and the reference features;
receiving, from a user of a client device, an indication that the user selects the detected distinct area within the image;
retrieving, by the one or more processors, contact information corresponding to the reference image, the contact information indicating a method of contacting an entity represented by the reference image; and
causing, by the one or more processors, the client device to display an interface allowing the user to contact the entity according to the method of contacting the entity.

2. The method of aspect 1, wherein comparing the detected features of the distinct area within the image to the reference features corresponding to the reference image includes, for each of a plurality of stored images including the reference image, comparing the detected features of the distinct area to stored image features corresponding to the stored image.

3. The method of aspect 2, wherein comparing the detected features to the stored image features for each of the plurality of stored images includes sequentially comparing the detected features to the stored image features for each of the plurality of stored image until determining that the detected distinct area matches the reference image.

4. The method of either aspect 2 or aspect 3, wherein comparing the detected features to the stored image features for each of the plurality of stored images includes simultaneously comparing the detected features to the stored image features for each of the plurality of stored images.

5. The method of any one of the preceding aspects, wherein comparing the detected features of the distinct area within the image to the reference features includes comparing a detected color within the distinct area and a reference color within the reference image.

6. The method of any one of the preceding aspects, wherein comparing the detected features of the distinct area within the image to the reference features includes comparing a detected edge within the distinct area and a reference edge within the reference image.

7. The method of any one of the preceding aspects, wherein retrieving the contact information corresponding to the reference image includes retrieving the contact information indicating a plurality of methods of contacting the entity including the method of contacting the entity, and wherein causing the client device to display the interface includes causing the client device to display the interface allowing the user to selectively contact the entity according to one of the plurality of methods of contacting the entity.

8. The method of any one of the preceding aspects, further comprising determining the method of contacting the entity based on the retrieved contact information and based on a property of the client device.

9. The method of aspect 8, wherein the property of the client device is a geographic location of the client device.

10. The method of either aspect 8 or aspect 9, wherein the property of the client device is an ability of the client device to contact the entity according to the plurality of methods.

11. A system for facilitating communications, the system comprising:
one or more processors; and
one or more non-transitory memories coupled to the one or more processors,
wherein the one or more non-transitory memories include computer executable instructions specially configuring the computer device such that, when executed by the one or more processors, the computer executable instructions cause the one or more processors to:
detect a distinct area within an image;
compare features of the distinct area within the image to reference features corresponding to a reference image;
determine that the detected distinct area matches the reference image based on the comparison between the detected features and the reference features;
receive an indication that the user selects the detected distinct area within the image;
retrieve contact information corresponding to the reference image, the contact information indicating a method of contacting an entity represented by the reference image; and
cause the client device to display an interface allowing the user to contact the entity according to the method of contacting the entity.

12. The system of aspect 11, wherein the entity is a business.

13. The system of aspect 12, wherein the reference image depicts a logo of the business.

14. The system of either aspect 12 or aspect 13, wherein the contact information indicates a phone number of the business, and wherein causing the client device to display the interface allowing the user to contact the business includes causing the client device to display the interface allowing the user to call the phone number of the business.

15. The system of any one of aspects 12 to 14, wherein the contact information indicates a website of the business, and wherein causing the client device to display the interface allowing the user to contact the business includes causing the client device to display the interface allowing the user to visit the website of the business via a web browser application.

16. The system of any one of aspects 12 to 15, wherein the contact information indicates an email address of the business, and wherein causing the client device to display the interface allowing the user to contact the business includes causing the client device to display the interface allowing the user to email the email address of the business.

17. The system of any one of aspects 11 to 16, wherein the image depicts a scanned document.

18. The system of any one of aspects 11 to 17, wherein the image depicts a website.

19. The system of any one of aspects 11 to 18, wherein the computer executable instructions further cause the one or more processors to cause the client device to display the image to the user along with an indication of the detected distinct area within the image, and wherein receiving the indication that the user selects the detected distinct area within the image includes receiving the indication that the user selects the detected distinct area on the displayed image.

20. The system of any one of aspects 11 to 19, wherein retrieving the contact information corresponding to the reference image includes retrieving the contact information indicating multiple methods of contacting the entity represented by the reference image; and wherein causing the client device to display the interface allowing the user to contact the entity includes causing the client device to display the interface allowing the user to contact the entity according to one or more of the multiple methods of contacting the entity.

We claim:

1. A computer-implemented method, comprising:
    detecting, by one or more processors, a distinct area within a digital image, wherein the digital image is a webpage portion as sourced by a client device from a website of a first entity;
    detecting, by one or more processors, one or more features associated with the distinct area defining a detected distinct area, the one or more detected features including one or more first detected features and one or more second detected features that are different than one another;
    identifying, by the one or more processors, which of a plurality of stored reference images has one or more first reference features matching the one or more first detected features to provide a narrowed subset of the plurality of stored reference images;
    identifying, by the one or more processors, a reference image from among the narrowed subset of the plurality of stored reference images having one or more second reference features matching the one or more second detected features;
    receiving, from the client device, (i) an indication that a user has selected the detected distinct area within the digital image and (ii) a geographic location of the client device, wherein the reference image is stored remotely from the client device and is compared remotely to the detected distinct area as selected by the user;
    retrieving, by the one or more processors, contact information corresponding to the reference image, the contact information indicating at least one method of contacting one or more branches of the first entity represented by the reference image;
    identifying, by the one or more processors, a proximate branch of the one or more branches of the first entity that is proximate to the geographic location of the client device;
    determining, by the one or more processors, a first method of contacting the proximate branch, the first method being one of the at least one methods of contacting one or more branches of the first entity; and
    causing, by the one or more processors, the client device to display an interface allowing the user to contact the proximate branch according to at least the first method.

2. The method of claim 1, wherein the act of determining whether the one or more second detected features match the one or more second reference features corresponding to the reference image includes sequentially comparing the one or more second detected features of the distinct area to the one or more second reference features corresponding to each reference image from among the subset of the plurality of stored reference images until it is determined that the one or more second detected features of the detected distinct area match one or more second reference features of the reference image.

3. The method of claim 1, wherein the act of determining whether the one or more second detected features match the one or more second reference features corresponding to the reference image includes simultaneously comparing the one or more second detected features of the distinct area to the one or more second reference features corresponding to each of two or more images, respectively, from among the subset of the plurality of stored reference images.

4. The method of claim 1, wherein the act of determining whether the one or more second detected features match the one or more second reference features corresponding to the reference image includes comparing a detected color within the distinct area to a reference color within each reference image from among the subset of the plurality of stored reference images.

5. The method of claim 1, wherein the act of determining whether the one or more second detected features match the one or more second reference features corresponding to the reference image includes comparing a detected edge within the distinct area to a reference edge within a reference image from among the subset of the plurality of stored reference images.

6. The method of claim 1, wherein the act of retrieving the contact information corresponding to the reference image includes retrieving the contact information indicating a plurality of methods of contacting the first entity including the first method of contacting the first entity, and
    wherein the act of causing the client device to display the interface includes causing the client device to display the interface allowing the user to selectively contact the first entity according to one of the plurality of methods of contacting the first entity.

7. The method of claim 1, further comprising:
    determining, by the one or more processors, the at least one method of contacting one or more branches of the first entity based on the retrieved contact information and a property of the client device, wherein the property includes the geographic location of the client device.

8. The method of claim 1, wherein the one or more first detected features and the one or more second detected features include one or more of:
    colors;
    shapes;
    a number of edges;
    texture; and
    image entropy.

9. A system for facilitating communications, the system comprising:
    one or more processors; and
    one or more non-transitory memories coupled to the one or more processors,
    wherein the one or more non-transitory memories include computer executable instructions configuring a client device such that, when executed by the one or more processors, the computer executable instructions cause the one or more processors to:
        detect a distinct area within a digital image, wherein the digital image is a webpage portion as sourced by the client device from a website of a first entity;
        detect one or more features associated with the distinct area defining a detected distinct area, the one or more detected features including one or more first detected features and one or more second detected features that are different than one another;
        identify which of a plurality of stored reference images has one or more first reference features matching the one or more first detected features to provide a narrowed subset of the plurality of stored reference images;
        identify a reference image from among the narrowed subset of the plurality of stored reference images having one or more second reference features matching the one or more second detected features;

receive (i) an indication that a user has selected the detected distinct area within the digital image and (ii) a geographic location of the client device, wherein the reference image is stored remotely from the client device and is compared remotely to the detected distinct area as selected by the user;

retrieve contact information corresponding to the reference image, the contact information indicating at least one method of contacting one or more branches of the first entity represented by the reference image;

identify a proximate branch of the one or more branches of the first entity that is proximate to the geographic location of the client device;

determine a first method of contacting the proximate branch, the first method being one of the at least one methods of contacting one or more branches of the first entity; and cause the client device to display an interface allowing the user to contact the proximate branch according to at least the first method.

10. The system of claim 9, wherein the first entity is a business.

11. The system of claim 10, wherein the reference image depicts a logo of the business.

12. The system of claim 10, wherein the contact information indicates a phone number of the business, and
wherein the computer executable instructions further cause the one or more processors to cause the client device to display the interface allowing the user to contact the business by displaying the interface allowing the user to call the phone number of the business.

13. The system of claim 10, wherein the contact information indicates the website of the business, and
wherein the computer executable instructions further the one or more processors to cause the client device to display the interface allowing the user to contact the business by displaying the interface allowing the user to visit the website of the business via a web browser application.

14. The system of claim 10, wherein the contact information indicates an email address of the business, and
wherein the computer executable instructions further cause the one or more processors to cause the client device to display the interface allowing the user to contact the business by displaying the interface allowing the user to email the email address of the business.

15. The system of claim 9, wherein the digital image depicts a website.

16. The system of claim 9, wherein the computer executable instructions further cause the one or more processors to cause the client device to:
display the digital image to the user along with an indication of the detected distinct area within the digital image, and
receive the indication that the user has selected the detected distinct area within the digital image by receiving the indication that the user has selected the detected distinct area on the displayed digital image.

17. The system of claim 9, wherein the computer executable instructions further cause the one or more processors to cause the client device to:
retrieve the contact information corresponding to the reference image by retrieving the contact information indicating a plurality of methods of contacting the first entity represented by the reference image including the first method of contacting the first entity represented by the reference image; and
display the interface allowing the user to selectively contact the first entity by displaying one or more of the plurality of methods of contacting the first entity.

18. The system of claim 9, wherein the one or more first detected features and the one or more second detected features include one or more of:
colors;
shapes;
a number of edges;
texture; and
image entropy.

* * * * *